United States Patent [19]

Yoshikawa

[11] Patent Number: 5,241,535
[45] Date of Patent: Aug. 31, 1993

[54] TRANSMITTER AND RECEIVER EMPLOYING VARIABLE RATE ENCODING METHOD FOR USE IN NETWORK COMMUNICATION SYSTEM

[75] Inventor: Hidetaka Yoshikawa, Hino, Japan

[73] Assignee: Kabushiki Kaisha Toshiba, Kawasaki, Japan

[21] Appl. No.: 761,649

[22] Filed: Sep. 18, 1991

[30] Foreign Application Priority Data

Sep. 19, 1990 [JP] Japan .................. 2-249300

[51] Int. Cl.⁵ .................................. H04J 3/26
[52] U.S. Cl. ........................... 370/60; 370/79; 370/82
[58] Field of Search ............. 370/50, 60, 60.1, 79, 370/81, 84, 94.1, 94.2, 99, 109, 82

[56] References Cited

U.S. PATENT DOCUMENTS

4,100,377  7/1978  Flanagan ................ 370/81

OTHER PUBLICATIONS

D. Goodman, "Embedded DPCM for Variable Bit Rate Transmission," *IEEE Transactions on Communications,* vol. COM-28, No. 7, Jul. 1980, pp. 1040-1046.
N. S. Jayant and P. Noll, "Digital Coding of Waveforms", Chapter 11, Prentice-Hall, Inc., pp. 486-509.
L. R. Rabiner and R. W. Shater, "Digital Signal Processing of Speech" Corona Publishing Co., Ltd.
CCITT SGXVIII "Annex to Question X/XV (Speech Packetization) Algorithm and Protocol for Speech Packetization," TD131, Geneva Jun. 6-17, 1988.

*Primary Examiner*—Douglas W. Olms
*Assistant Examiner*—Melvin Marcelo
*Attorney, Agent, or Firm*—Finnegan, Henderson, Farabow, Garrett & Dunner

[57] ABSTRACT

As an encoded signal for transmission to a packet communication network or an ATM communication network, signals of a plurality of frequency subbands are independently encoded in units of frames, and an encoded bit rate is controlled in that frame unit. The deterioration of quality due to cell discarding is light, and an improvement in encoding efficiency can be expected through the joint use of entropy coding processing.

19 Claims, 13 Drawing Sheets

TRANSMITTER AND RECEIVER EMPLOYING VARIABLE RATE ENCODING METHOD FOR USE IN NETWORK COMMUNICATION SYSTEM

BACKGROUND OF THE INVENTION

1. Field of the Invention

The present invention relates to a transmitter and a receiver for use in a network communication system such as an ATM (asynchronous transfer mode) communication system and a packet communication system so as to effect communication of cells or packets on the basis of a variable rate encoding method.

2. Description of the Related Art

A packet communication system in which a voice signal is coded and is then packetized to effect communication in units of packets is becoming realized.

The packet communication system offers the advantage that signals of various media, such as voice, images and data, can be handled unitarily, and that the efficient use of a line can be realized by transmitting signals only during talk spurt sections.

In the packet communication, however, during the congestion of a network or when a packet delay is large, packets are discarded, with the result that deterioration of voice quality occurs.

Particularly when ADPCM (adaptive differential pulse-code modulation) using adaptive estimation is employed as an encoding method, the deterioration of quality during discarding of packets is large.

Accordingly, as an encoding method in which the deterioration of quality during discarding of packets is light, an embedded DPCM method has been proposed in "Embedded DPCM for variable bit rate transmission," [IEEE trans. COM-28, 7, pp. 1040-1046 (July 1980); referred to as literature 1].

In addition, in CCITT SGXVIII "Annex to Question X/XV (Speech Packetization) Algorithm and Protocol for Speech Packetization," [TD131, Geneva 6-17 June 1988; referred to as literature 2], CCITT has provisionally recommended embedded ADPCM as G, EMB as an encoding method for speech packet communication and the protocol for speech packetization as G, PVNP.

FIGS. 15 and 16 show block diagrams of an encoder section and a decoder section of the provisionally recommended G, EMB system.

In the encoder section shown in FIG. 15, an input to an input terminal 600 is a voice signal digitized by μ-PCM or A-PCM coding method. A PCM format converter 610 converts a μ-PCM or A-PCM code to a linear PCM code. A subtracter 620 calculates the difference between the input signal and an estimated signal, i.e., an output of an adaptive estimator 670, and transmits an estimated differential signal to an adaptive quantizer 630. The adaptive quantizer 630 quantizes the estimated differential signal inputted thereto, and outputs the same as an ADPCM code.

A bit masking circuit 640 masks less significant bits of the output code of ADPCM by the maximum number of bits that can be discarded, and shifts the remaining bits to the right. The output of the bit masking circuit 640 is transmitted to an adaptive inverse quantizer 650 as core bits, and the adaptive inverse quantizer 650 inversely quantizes the core bits. The output of the adaptive inverse quantizer 650 is transmitted to the adaptive estimator 670 and an adder 660. The adder 660 also prepares a local decoding signal by adding the output signal of the adaptive inverse quantizer 650 and the output signal of the adaptive estimator 670. The adaptive estimator 670 is an adaptive filter which has quadratic poles and sextic zero points, receives as its inputs the local decoded signal and the inversely quantized estimated differential signal, and creates an estimated signal.

The number of bits of the adaptive quantizer 630 and the number of core bits fed back depend on an algorithm used. For instance, in the case of a 32 Kbps (4, 2) algorithm, four bits are used for quantization, and two bits as core bits.

In FIG. 15, the adaptive quantizer 630 forms a feed forward path, while the bit masking circuit 640, the adaptive inverse quantizer 650, and the adaptive estimator 670 form a feedback path.

A description will now be given of the operation of the decoder section.

In the same way as the above-described encoder section, the decoder section shown in FIG. 16 comprises a feedback path including a bit masking circuit 680, a feedback adaptive inverse quantizer 690, and an adaptive estimator 710, and a feed forward path including a feed forward adaptive inverse quantizer 720 and a PCM format converter 740. The feedback path of the encoder section and that of the decoder section are utterly the same.

In FIG. 16, the bit masking circuit 680 masks less significant bits by leaving more significant core bits of the ADPCM code inputted thereto, and shifts the remaining bits to the right, thereby transmitting only the core bits to the feedback adaptive inverse quantizer 690. Here, the feedback adaptive inverse quantizer 690 inversely quantizes the core bits. The adaptive estimator 710 receives as its inputs the inversely quantized estimated differential signal, i.e., the output of the feedback adaptive inverse quantizer 690, and a local decoded signal, i.e., an output of an adder 700, and outputs an estimated signal.

The discarding of bits on a network is effected starting with the least significant bit of the ADPCM code, and the transmission of core bits is ensured.

For this reason, the same output as that of the encoder section-side bit masking circuit 640 is obtained as the output of the decoder section-side bit masking circuit 680. Accordingly, the outputs of the adaptive inverse quantizers 690, 650 and the adaptive estimators 710, 670 are utterly identical for the encoder section and the decoder section.

The feed forward adaptive inverse quantizer 720 inversely quantizes the core bits of the ADPCM output code and the bits which remained without being discarded. An adder 730 adds together the output of the feed forward adaptive inverse quantizer 720 and the output of the adaptive estimator 710 so as to form a decoded signal. The decoded signal thus obtained is outputted to the PCM format converter 740 where the linear PCM code is converted to the μ-PCM or A-PCM code.

A tandem connection correcting circuit 750 is used to prevent errors due to synchronous tandem connection as in ADPCM-PCM-ADPCM.

In cases where the discarding of bits of the output code occurs in normal ADPCM which is not embedded, the inversely quantized estimated differential signal assumes different values between the encoder section and the decoder section. As a result, the adaptation processing of the quantizer and the estimator undergoes different asynchronous operation between the encoder section and the decoder section. In addition, since the error due to discarding is subjected to filtering by a synthesis filter and increases as a result, the deterioration of voice quality due to the discarding of bits becomes more pronounced.

Meanwhile, in the aforementioned embedded ADPCM, since only the core bits are fed back to the estimator, even if the less significant bits excluding the core bits are discarded on the network, the asynchronous operation of the encoder section and the decoder section does not occur.

In addition, since the estimated signals are identical in the encoder section and the decoder section, a quantization error corresponding to the number of bits discarded only directly affects the decoded signal, and the deterioration of quality due to the discarding of bits is light.

A method of configuration and a protocol of a voice packet which make use of such characteristics of embedded ADPCM are described in the aforementioned literature 2.

FIG. 17 is a packet format described in literature 2, and bit 1 and bit 8 indicate LSB and MSB, respectively. PD (protocol discriminator) discriminates between voice packets and the other packets. BDI (block dropping indicator) indicates the number of blocks that can be discarded in a packetized initial state and the number of blocks that can be discarded on the nodes of the network. The block referred to herein means information in the unit of 128 bits in which, by setting the length of a coded frame to be 16 ms (128 samples), coded outputs of voice are collected in bits for one frame. TS (time stamp) shows a cumulative total of an amount of delay occurring in each node of the network. CT (coding type) is a field indicating a method of voice encoding used in packetization. SEQ (sequence number) indicates a serial number of the packet and is used for ascertaining such as the loss of the packet. NS (noise field) is a field indicating the level of background noise. NON-DROPPABLE OCTETS represents a block of core bits of an embedded ADPCM output and is the field of information which cannot be discarded on the network. OPTIONAL DROPPABLE BLOCKS is a block of less significant bits and is a field which can be discarded when so requested by the system on the network. The header and trailer of layer 2 are attached to the leading and trailing ends of the packet, respectively.

In the protocol of the packet network using the packet provided with the format shown in FIG. 17, the discarding of packets is effected by discarding the OPTIONAL DROPPABLE BLOCKS in the packet.

In the above, a method of compensating for the discarding of packets on the basis of the conventional embedded ADPCM and packet format will now be described.

According to this method, in a case where the discarding of information takes place within a packet, i.e., in units of bits, the deterioration of quality is light, as described above. However, in a case where discarding occurs in units of packets, since the core bits of embedded ADPCM are also discarded, the deterioration of the quality occurs. As a result of the discarding of the packet, the signals of one frame (16 ms) drop completely, so that reproduction of the original voice signals becomes impossible. This state does not end with one frame, and since the encoder section and the decoder section operate asynchronously, this state continues for more than one frame.

Although, as a method of compensating for discarding in units of packets, a method is known in which compensation and reproduction are effected from the signals of packets immediately preceding and following the discarded packet. According to this method, however, since the estimated differential signal which is an ADPCM output is a signal in which correlation has been eliminated, even if interpolation is effected by using a sample which is one frame (128 samples) apart, there is practically no advantage of interpolation. Hence, the deterioration of quality has been unavoidable.

With the conventional encoding method using embedded ADPCM in the above-described manner, there have been problems in that since core bits of embedded ADPCM are also discarded when discarding has taken place in units of packets, it becomes impossible to reproduce the original voice signals, and that since the encoder section and the decoder section operate asynchronously, the deterioration of quality is intense.

In addition, with the conventional embedded ADPCM, no active consideration has been given to changing the bit rate with time, and no sufficient examination has been conducted on the method of controlling the bit rate and the formation of cells of a fixed length.

In contrast, the amount of information which is present in a voice signal generally changes with time. Hence, according to the embedded ADPCM using a fixed bit rate, there have been problems in that the quality of encoded voice changes and is unpleasant to the ear, and that the encoding efficiency declines.

SUMMARY OF THE INVENTION

Accordingly, an object of the present invention is to provide a transmitter or a receiver in which, when it is used in a network communication system, the deterioration of quality is light even if discarding is effected in units of packets, and which makes it possible to maintain stable quality.

Another object of the present invention is to provide a transmitter which, when it is used in a network communication system, is capable of eliminating the correlation or redundancy of an input signal on the basis of maintaining stable quality with respect to discarding in units of packets, and is capable of encoding the input signal with high efficiency.

A further object of the present invention is to provide a transmitter which, when it is used in a network communication system, is capable of effecting encoding processing useful for stabilizing the quality of a decoded signal on a receiver side.

A still further object of the present invention is to provide a receiver which is provided with an effective interpolation method with respect to discarding in units of packets in a network communication system, and which is capable of controlling the deterioration of quality on a voice to a minimum.

To attain the above objects, in accordance with the present invention, there is provided a transmitter for use in a network communication system, comprising: band-signal dividing means for dividing a signal sequence, such as a voice signal into signals of a plurality of frequency subbands (divided frequency band); coding means for coding the signal of each of the subbands by an entropy coding method; and information-unit composing means for composing the coded signal of each of the subbands into an information unit of a fixed length or a variable length, wherein in a case where the signal sequence is transmitted via the network communication system, the signal sequence is coded by the entropy coding method in units of frames with respect to each signal of the plurality of frequency subbands, and is transmitted to a network of the network communication system as the information unit of the fixed length or the variable length.

A receiver associated with the above-described transmitter comprises: information-unit decomposing means for decomposing an information unit having a fixed length or a variable length and composed of a signal sequence entropy-coded for a plurality of subbands, into encoded signals of the plurality of subbands; decoding means for decoding the decomposed entropy-coded signal of each of the subbands; and combining means for combining the decoded signals of the subbands into a signal of a full band, wherein in a case where the information unit having the fixed length or the variable length and entropy-coded for each of the subbands is received from the network of the network communication system, the information unit is decoded in units of frames for each of the subbands, and the decoded signal sequence of the full band is obtained by combining the decoded signals.

Another transmitter in accordance with the present invention comprises: band-signal dividing means for dividing a signal sequence, of such as a voice signal into signals of a plurality of frequency subbands; power calculating means for calculating the power (route means square) of a signal of each of the plurality of subbands; number-of-quantized-bits calculating mean for calculating the number of bits at the time of quantizing the signal of each of the subbands, on the basis of the power determined by the power calculating means; bit-rate control means for variably controlling the distribution of the numbers of quantized bits determined by the number-of-quantized-bits calculating means; quantizing means for quantizing the signal of each of the subbands on the basis of the number of quantized bits distributed through control by the bit rate control means; coding means for coding the quantized signal by an entropy coding method; and information-unit composing means for composing a time stamp, the encoded signal for each subband, power of the signal, the number of samples, and the number of the quantized bits into an information unit of a fixed length or a variable length, wherein in a case where the signal sequence is transmitted via the network communication system, the signal sequence is coded by the entropy coding method in units of frames at different bit rates for the respective signals of the plurality of frequency subbands, and is transmitted to a network of the network communication system as the information unit of the fixed length or the variable length.

In particular, this transmitter further comprises means for estimating the quality of a decoded signal on a receiver side from a bit rate calculated for a specific number of input sample signals, wherein the bit-rate control means varies the bit rate by increasing or decreasing the number of input samples in such a manner that the quality of the estimated decoded signal becomes fixed.

In addition, this transmitter further comprises code-amount calculating means for calculating a sum total of an amount of data encoded for each of the subbands by the coding means, wherein the bit-rate control means variably controls the bit rate of the signal of each of the subbands in such a manner that the sum total of the amount of data encoded for the respective subbands becomes a fixed value.

The receiver of the present invention associated with the above-described transmitter comprises: information-element decomposing means for decomposing an information unit having a fixed length or a variable length and composed of a signal sequence representing a time stamp, an entropy-coded signal for each of a plurality of frequency subbands, power of the signal, the number of samples, and the number of quantized bits; decoding means for decoding the entropy-coded signal for each of the subbands; combining means for combining the decoded signals of the subbands into a signal of a full band; discarded-information detecting means for detecting an information element discarded on the basis of a result of the decomposition of the information unit by the information-element decomposing means; and reproducing means for reproducing a section of the discarded information element, wherein in a case where the information unit having the fixed length or the variable length and obtained by encoding the signals of the plurality of subbands at different bit rates for units of frames is received from a network of the network communication system, the information unit is decoded in units of frames for each of the subbands so as to compose a decoded signal of the full band, and a decoded signal sequence is obtained while an interpolation is being conducted in units of the discarded information recognized in the meantime.

In this receiver, the reproducing means may further comprise: LPC analyzing means for determining an estimated residual signal a by LPC analysis on the basis of a cell immediately preceding a discarded cell; pitch analyzing means for determining a pitch period, a gain, and an estimated residual signal b from the estimated residual signal a by pitch analysis; drive-signal generating means for repeatedly generating a drive signal by multiplying a signal corresponding to the pitch period at a trailing end of the estimated residual signal b by the pitch gain; synthesis filter means for combining a signal corresponding to a discarded information element on the basis of the drive signal; and incorporating means for incorporating the combined signal into a cell-discarded section.

In addition, the incorporating means of the receiver may be constituted by a smoothing circuit.

As described above, in the present invention, estimation using past signals and synchronous adaptive control of quantizers in an encoder section and a decoder section are not effected in the manner of conventional ADPCM. Instead, in the transmitter the signals of a plurality of frequency subbands are encoded independently in units of frames and are sent to a network, while in the receiver the encoded signals from the network are decoded in the units of frames, and the decoded signals of a full band are then composed and outputted. Accordingly, even if any cell or packet is discarded in the course of its passage through the network, the influence of discarding does not affect an ensuing cell or packet, with the result that the deterioration of quality due to cell discarding can be controlled to be very small.

In addition, in accordance with the transmitter of the present invention, after the input signal is divided into signals of the plurality of frequency subbands by the band-signal dividing means, the signals of these sub-bands are quantized and coded by the coding means.

At that juncture, the distribution of bits for quantization and encoding of the signal for each of the subbands is variably controlled in units of frames by the bit-rate controlling means on the basis of power of the signal of each of the subbands determined by power calculating means.

By virtue of such a variable bit rate distribution based on power for each subband, it is possible to eliminate the correlation or redundancy of the input signal, and to encode the input signal with high efficiency.

At the same time, while a sum total of the numbers of encoded bits for the respective subbands is being monitored by the code-amount calculating means for calculating the sum total of the amount of data encoded for each subband by the coding means, the quality of the decoded signal on the receiving side is estimated as, for instance, SNR (signal-to-noise ratio), and the bit rate is controlled in such a manner that this SNR becomes fixed. Accordingly, the quality of the decoded signal can be maintained at a fixed level.

In addition, after the bit rate is changed by bit-rate control in correspondence with the change with time of the characteristics of the input signal, encoding processing through entropy coding processing is conducted, so that it is possible to obtain a very high encoding efficiency.

Subsequently, the encoded signal of each subband is multiplexed (cellulated or packetized) together with a signal representing the number of encoded bits of the signal of the subband, power, etc., of each subband by the means for composing an information unit called a cell or packet, and is sent to the network.

At this juncture, whether or not a priority is to be placed on each cell or packet may be determined arbitrarily.

In addition, in the receiver of the present invention adapted to the decoding of the cell or packet sent to the network as described above, the cell or packet received from the network is decomposed into elements by the decomposing means, and the entropy-coded signal of each subband therein is decoded. The decoded signal is inversely quantized in accordance with the number of bits distributed on the basis of the power of each subband, and the signals of the subbands are combined into a signal of a full band so as to obtain a decoded signal sequence.

In effecting decoding processing, the receiver detects a discarded packet from a result of decomposition of the cell or packet by the decomposing means, and reproduces the discarded section of the cell or packet.

In this interpolation, in the receiver, a drive signal of a period is generated repeatedly by multiplying the final predetermined-length pitch of the estimated residual signal of the cell immediately preceding the discarded cell. Concurrently, this drive signal is allowed to pass through the synthesis filter to regenerate the discarded cell and interpolates the same into the discarded cell section by smoothing processing.

According to an interpolation of the drive signal, even if there are discontinuous points in waveform with respect to cells immediately preceding and following the cell in question in the drive signal, since the discontinuous points are smoothed as they pass through the synthesis filter, the deterioration in quality at the voice level can be minimized.

Moreover, in the present invention, since the continuity between the immediately preceding and following cells is enhanced, the deterioration of the decoded signal due to cell discarding is hardly perceivable.

The above and other objects, features and advantages of the invention will become more apparent from the following detailed description of the invention when read in conjunction with the accompanying drawings.

Figure 14:
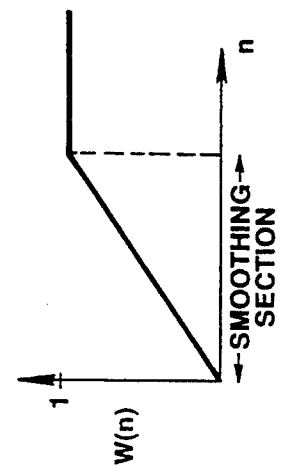
Figure 13:
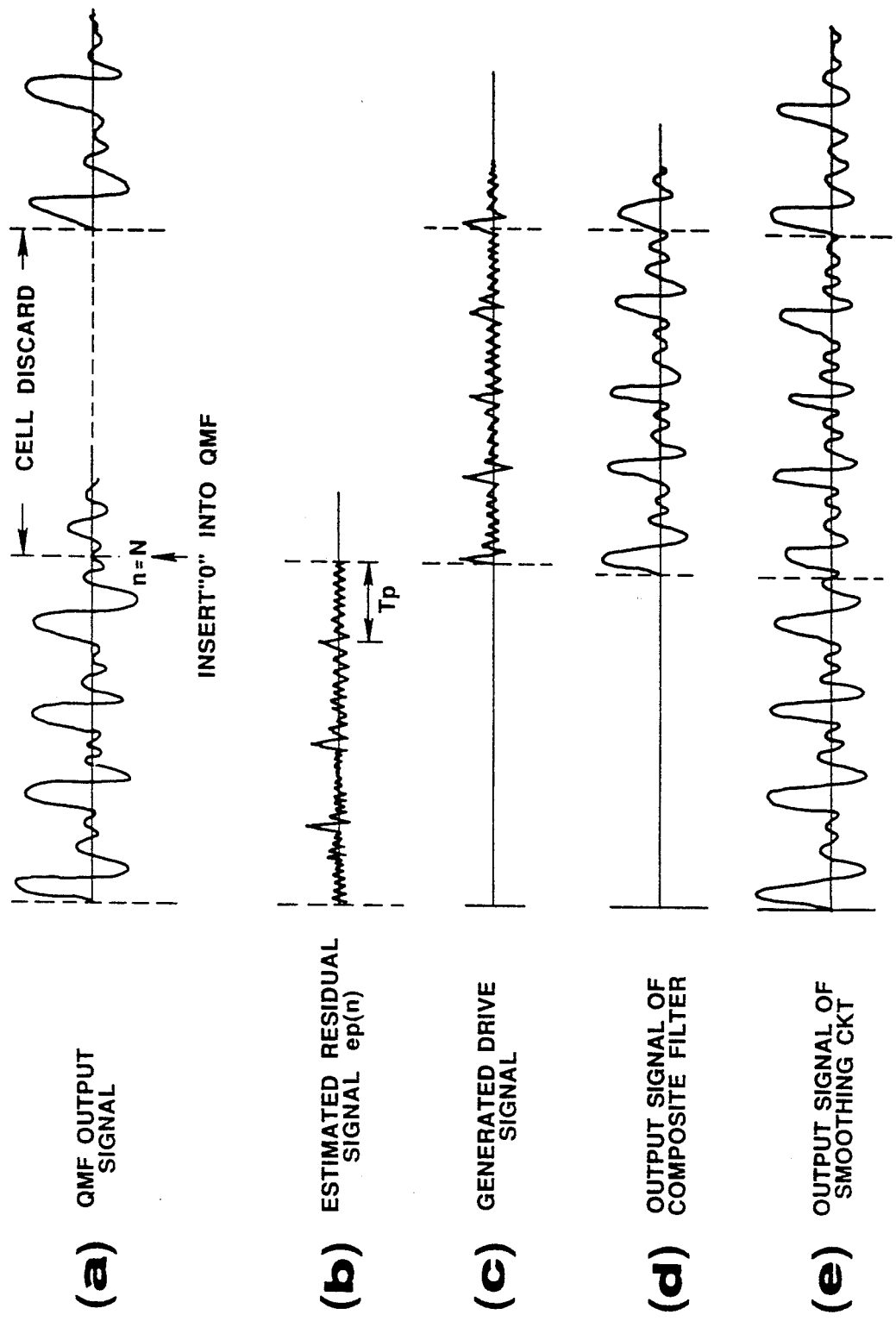
Figure 15:
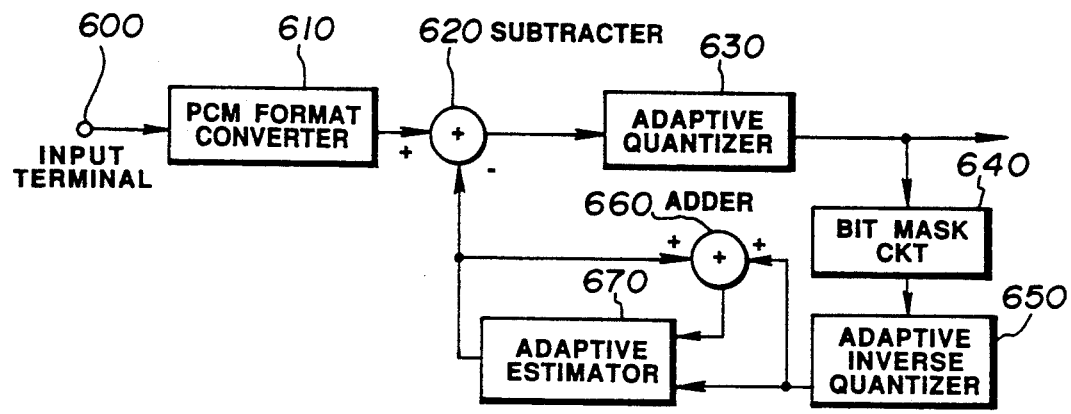
Figure 16:
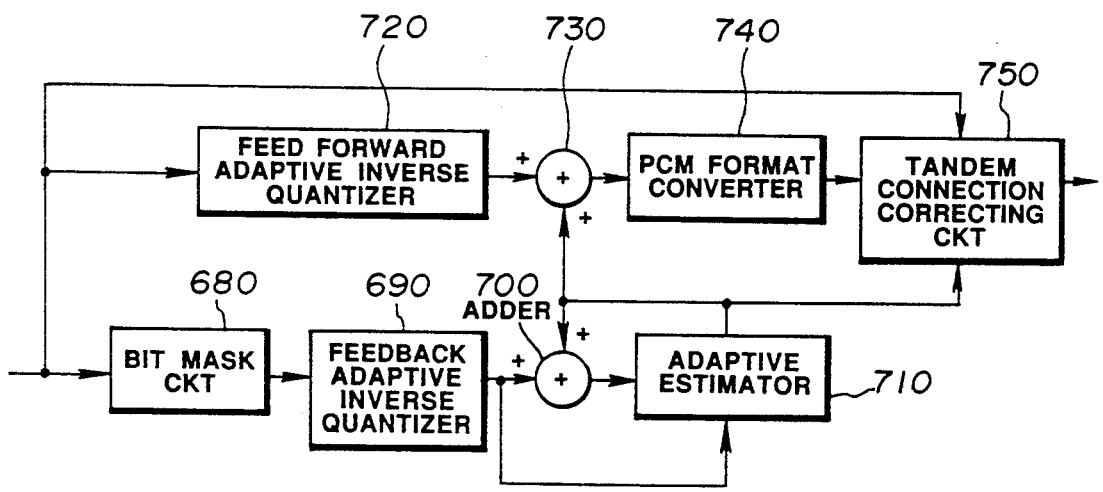
Figure 17:
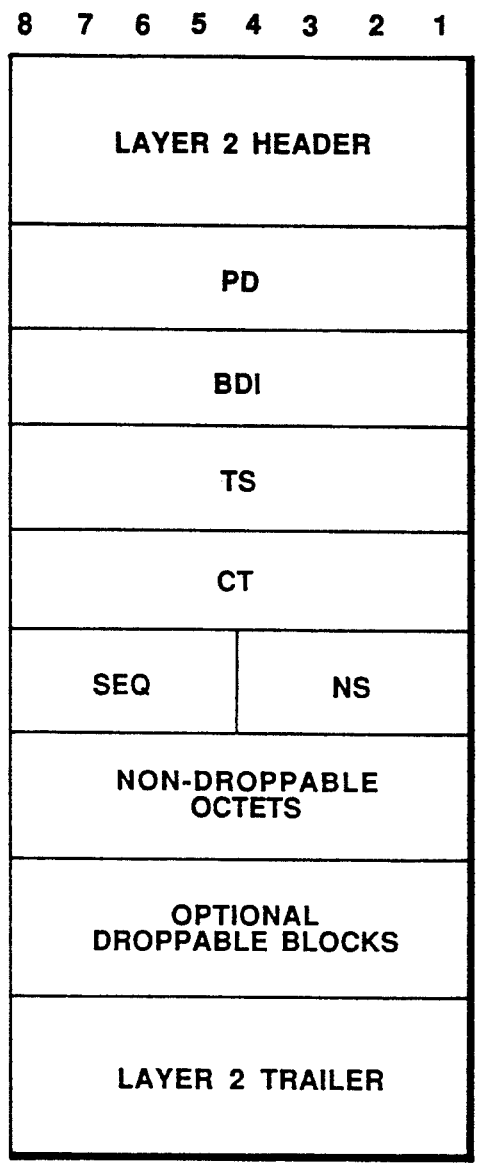

Parts (a) to (e) of FIG. 13 are examples of signal waveforms explaining interpolation by the interpolating unit;

FIG. 14 is a characteristic diagram of a window function concerning smoothing processing as one form of embodiment of interpolation;

FIG. 15 is a block diagram of a configuration of an encoder section of conventional embedded ADPCM;

FIG. 16 is a block diagram illustrating a configuration of the decoder section of the conventional embedded ADPCM; and FIG. 17 is a diagram illustrating an example of a packet format handled in a conventional network communication system.

DESCRIPTION OF THE PREFERRED EMBODIMENTS

Referring now to the accompanying drawings, a detailed description will be given of the embodiments of the present invention.

Figure 1:
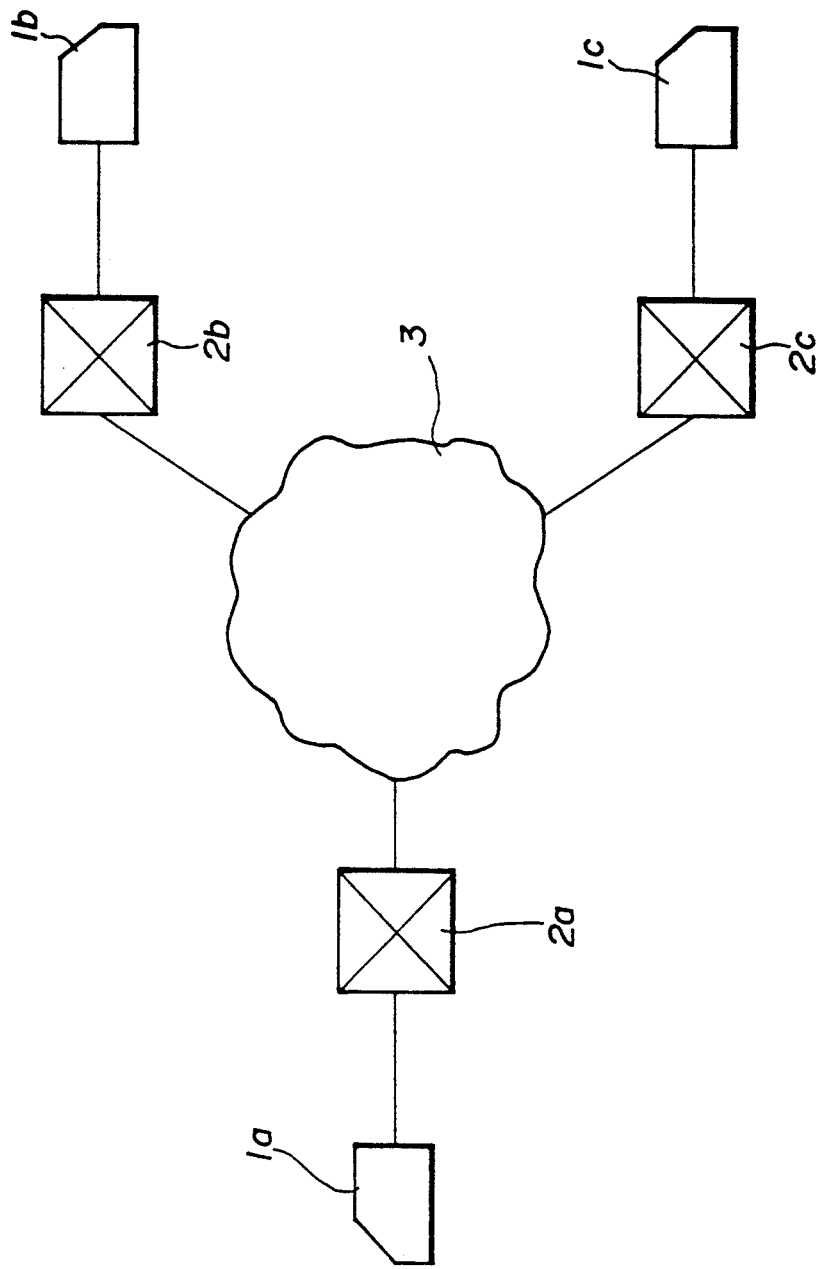
FIG. 1 is a diagram of a configuration of a network communication system in accordance with the present invention.

FIG. 1 is a system configuration diagram illustrating an example of a network communication system in accordance with the present invention. Communication terminals 1a-1c each having the function of a transmitter or a receiver are respectively connected to a digital data exchange network 3 via digital exchanges 2a-2c.

The digital data exchange network 3 in this network communication system is constituted by, for instance, an ATM exchange network, and ATM exchanges are used as the digital exchanges 2a-2c for this network.

In addition, in this network communication system, the digital data exchange network 3 can be constituted by a packet exchange network, in which case packet exchanges are used as the digital exchanges 2a-2c.

The communication terminals 1a-1c in accordance with the present invention can be connected to either the ATM exchange network or the packet exchange network. By virtue of the functional configuration of the network communication system, a cell of a fixed length or a packet of a variable length is transmitted, for instance, from the transmitter 1a to the receiver 1b via the network.

In particular, in the present invention, at the time of transmission of the aforementioned cell or packet, the transmitter 1a transmits to the network 3 data encoded by a variable rate encoding method, and the receiver 1b decodes the encoded signal received from the network 3 through opposite processing to that of encoding.

Figure 2:
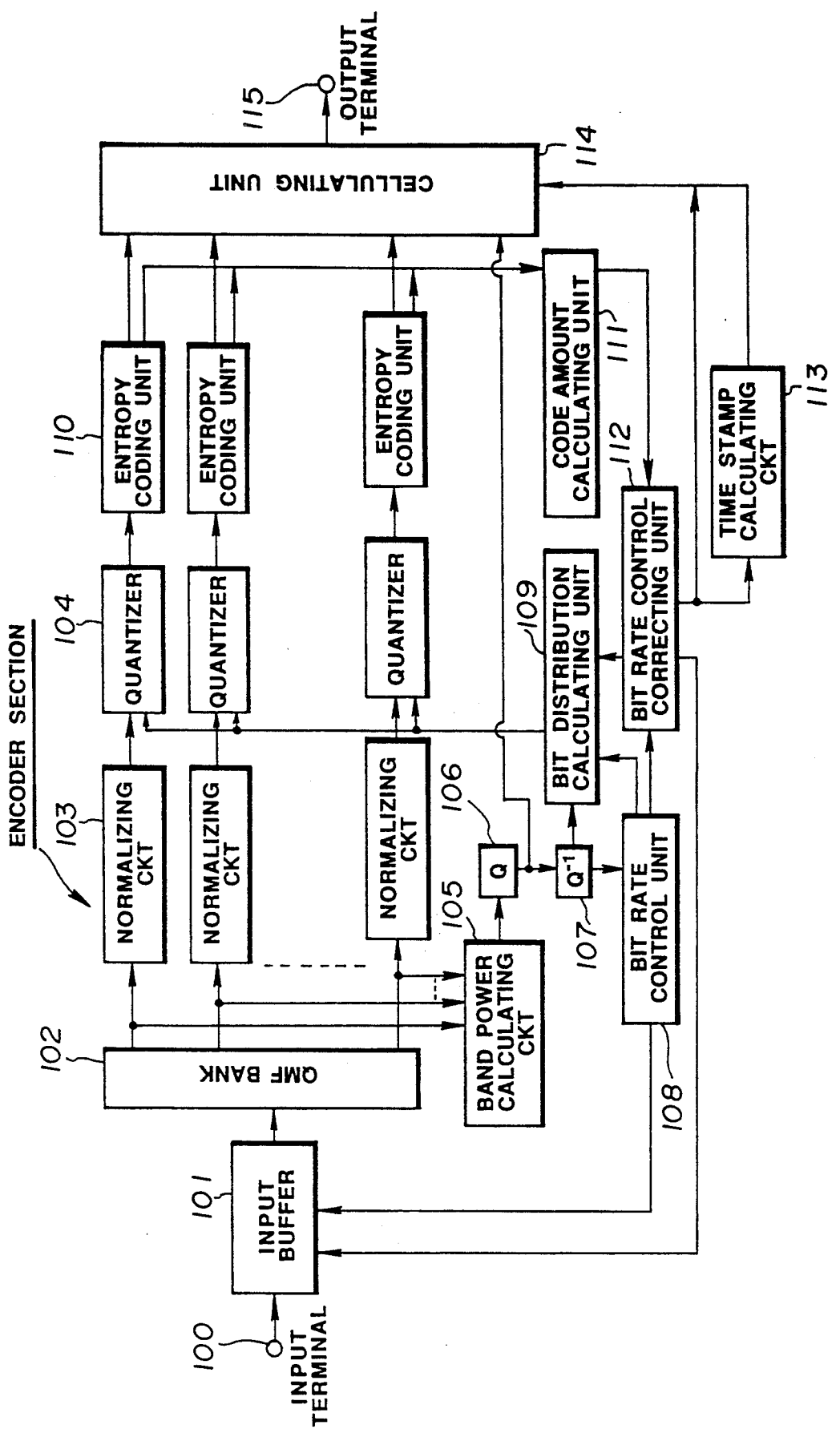
FIG. 2 is a block diagram illustrating an example of a configuration of an encoder section provided in a transmitter in the network communication system shown in FIG. 1.

FIG. 2 is a block diagram of a configuration of an encoder section provided in the transmitter 1a in the network communication system shown in FIG. 1 so as to realize the above-described transmission.

In FIG. 2, an input terminal 100 receives as its input a digitized signal sequence, and a train of a predetermined number of samples are accumulated in an input buffer 101 through the input terminal 100.

A filter bank 102 divides the inputted signal sequence into a plurality of frequency subbands. As an excellent filter bank which does not cause alaising of a spectrum, a QMF (quadrature mirror filter) bank is known, and in this embodiment a signal band up to 4 kHz is divided into eight bands at equal intervals.

Figure 3:
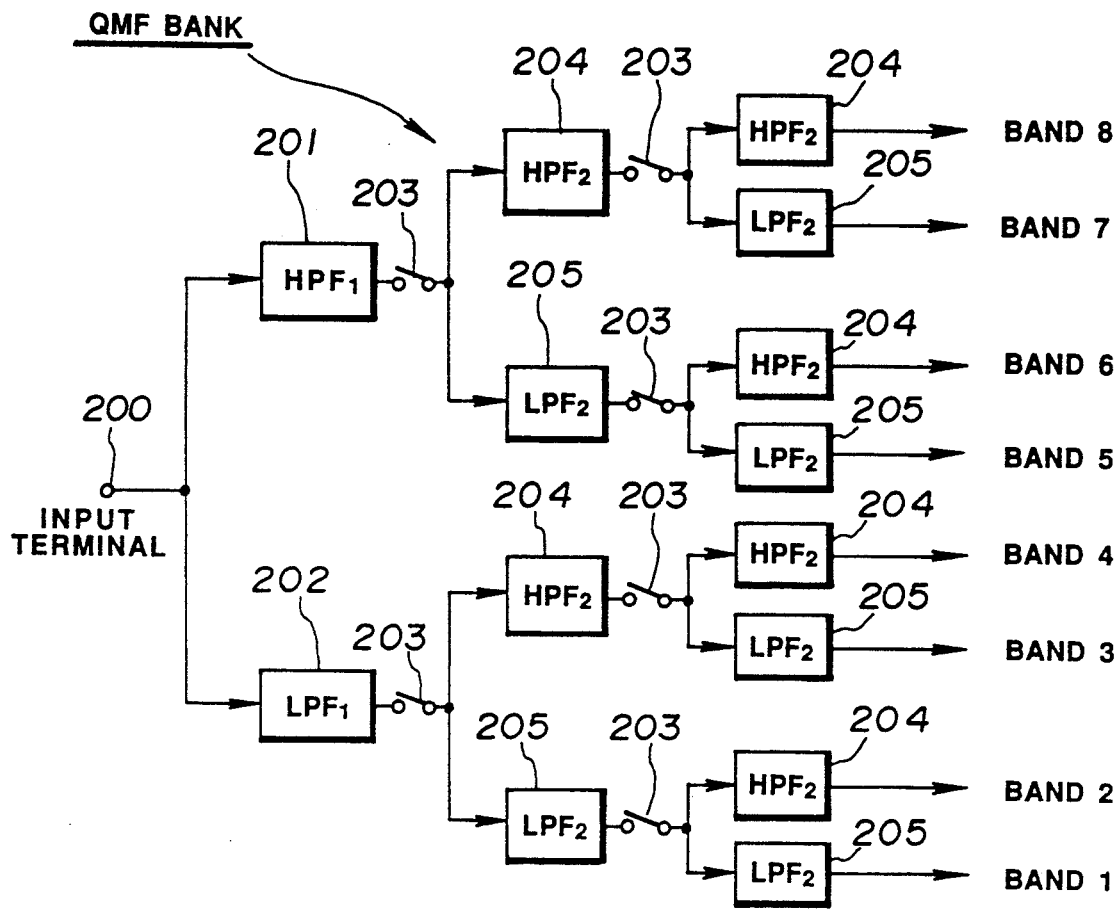
FIG. 3 is a block diagram illustrating an example of a QMF bank in the encoder shown in FIG. 2.

FIG. 3 shows a block diagram of an example of a configuration of the QMF bank 102.

In FIG. 3, a high-pass filter 201 and a low-pass filter 202 are each constituted by 32 FIR filters. A high-pass filter 204 and a low-pass filter 205 are each constituted by 16 FIR filters.

The fact that the numbers of filters in the first, second, and third stages of the QMF bank 102 are changed as described above brings about the effect that the amount of delay attributable to filtering calculation is reduced without deteriorating the performance of the filters, by making use of the fact the spectrum gradient of the voice signal differs between a low band and a high band.

It should be noted that the coefficient of the filter is so designed as not to cause aliasing of the spectrum. However, since its details are described in "Digital Coding of Waveforms" by N.S. Jayant and P. Noll, PRENTICE-HALL, INC. (referred to as literature 3), a description thereof will be omitted herein.

In FIG. 2, a normalizing circuit 103 is used to normalize the signals of respective bands which are outputs of the QMF bank 102 by way of pretreatment of quantization of the signals.

A simple, specific example of the normalizing circuit 103 can be realized by a circuit which divides the signal of each band by the RMS (root mean square) of each band.

A quantizer 104 quantizes the normalized signal of each band by means of a predetermined number of bits. An entropy coding unit 110 effects entropy coding with respect to the signal quantized by the quantizer 104. Since the probability of occurrence of the amplitude of the signal of each band is biased, compression by the entropy coding unit 110 becomes possible.

A code amount calculating unit 111 calculates the sum total of the code amount of each band encoded by the entropy coding unit 110.

A band power calculating circuit 105 calculates the power of the signal of each band. Specifically, if the signal sequence of an i-th band is set as $X_i(n)$, $i=1, 2, \ldots, 8$, the band power calculating circuit 105 calculates an RMS value $\sigma_i$ in accordance with the following formula and outputs the same:

$$\sigma_i = \sqrt{\frac{1}{N} \sum_{n=1}^{N} X_i^2(n)} \tag{1}$$

where the section length for calculating the RMS is set as N.

A quantizer 106 quantizes the RMS value $\sigma_i$ of each band outputted from the band power calculating circuit 105 by means of a predetermined number of bits, and outputs that code to a cellulating unit 114 and an inverse quantizer 107. The inverse quantizer 107 outputs a value $\widetilde{\sigma_i}$ in which the code of $\sigma_i$ mentioned above is inversely quantized. As the RMS value of each band, the normalizing circuit 103, as well as a bit rate control unit 108 and a bit distribution calculating unit 109, uses $\widetilde{\sigma_i}$ which is obtained by the decoder section which will be described later. As a result, it is possible to completely prevent the deterioration of characteristics resulting from a mismatching in which the number of quantized bits and parameters of normalization differ between the encoder section and the decoder section.

The bits rate control unit 108 controls the bit rate in such a manner that the quality of the signal decoded by the decoder section on the basis of the power of each band signal becomes fixed and a sum of the code amount of each band quantized before entropy coding becomes fixed. Details of this bit rate control unit 108 will be described later.

A bit rate control correcting unit 112 effects correction of the bit rate determined by the bit rate control unit 108, on the basis of the sum total of the code amount calculated by the code amount calculating unit 111.

The bit distribution calculating unit 109 calculates the number of bits to be distributed to the quantizers 104 in the respective bands on the basis of the bit rate outputted from the bit rate control unit 108 and the bit rate control correcting unit 112. Details of the bit distribution calculating unit 109 and the bit rate control correcting unit 112 will be described later.

A time stamp calculating circuit 113 calculates a subframe number at a leading end of the frame sent in the form of a cell. Specifically, the time stamp calculating circuit 113 calculates the number of subframes transmitted in one cell outputted from the bit rate control correcting unit 112.

If it is assumed that the time stamp of an i-th frame (cell) is Ts(i), that the time stamp of the (i−1)th frame (cell) is Ts(i−1), and that the number of subframes is Ns(i−1), Ts(i) can be calculated by the following formula:

$$Ts(i) = Ts(i-1) + Ns(i-1) \qquad (2)$$

Figure 4:
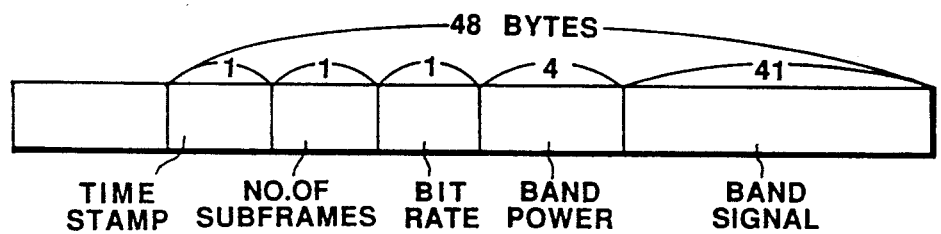
FIG. 4 is a diagram illustrating an example of a format of a cell transmitted between the transmitter and the receiver in accordance with the present invention.

In accordance with the format shown in FIG. 4, the cellulating unit 114 forms a cell with respect to a code train of each band signal, the code of the RMS value of each band signal, the number of subframes in one cell, the sum of the numbers of quantized bits distributed to the respective bands, and a time stamp.

In the format shown in FIG. 4, the overall cell length is 52 bytes, and the information section comprises 48 bytes. As for the breakdown of the information section, 1 byte is allotted to the time stamp, 1 byte to the number of subframes, 1 byte to the sum of the number of quantized bits, 4 bytes to the band power, and 41 bytes to the band signal.

The above is a description of the various functions of the encoder section shown in FIG. 2.

A description will now be given of the operation.

Figure 5:
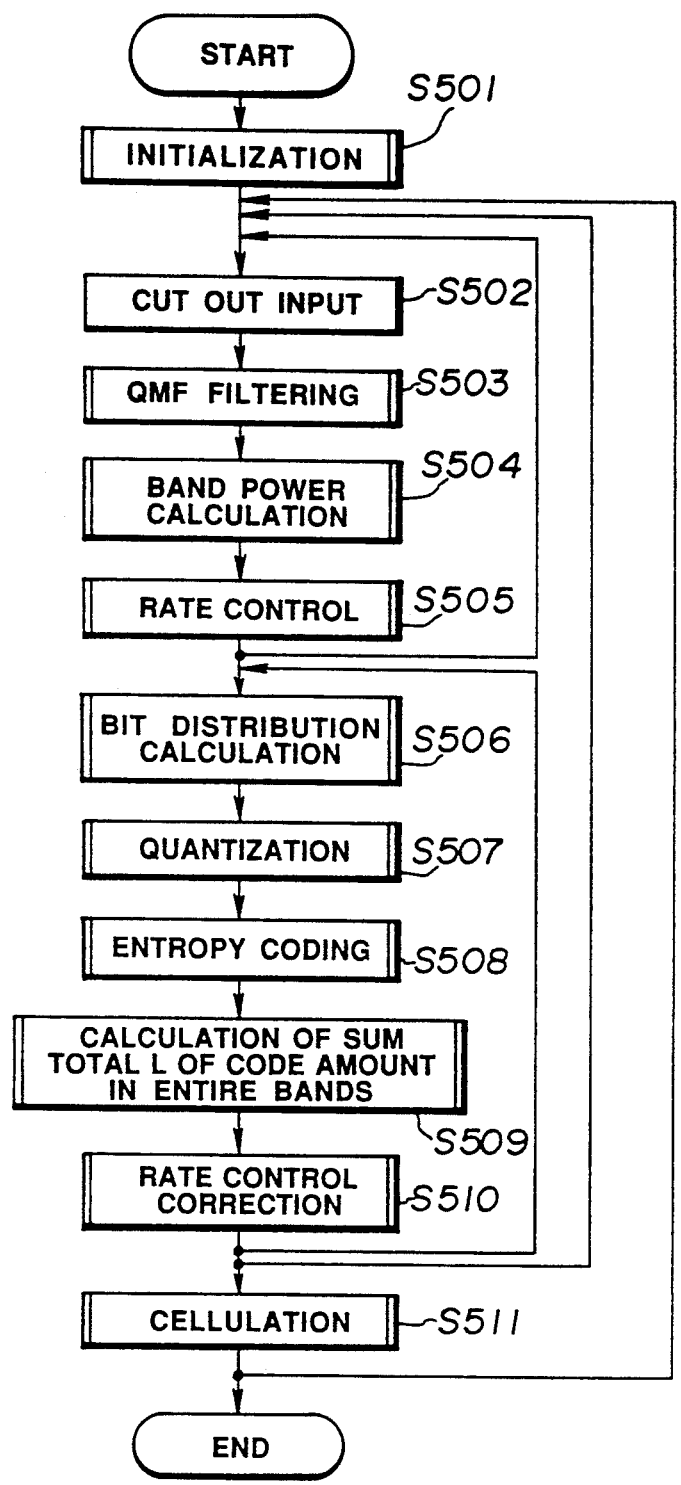
FIG. 5 is a flowchart illustrating the processing operation of the encoder section in the transmitter of the present invention.

FIG. 5 is a flowchart illustrating the overall operation of the encoder section.

First, by way of initialization, the input buffer 101, the QMF bank 102, and the time stamp calculating circuit 113 are cleared, and the targeted SNR, the maximum number of subframes, and the subframe length are set (S501).

Next, the cutting out of an input signal sequence in units of subframes, the calculation of the power of the band signals, and bit rate control are repeated until the targeted SNR is attained (S502-S505).

Figure 6:
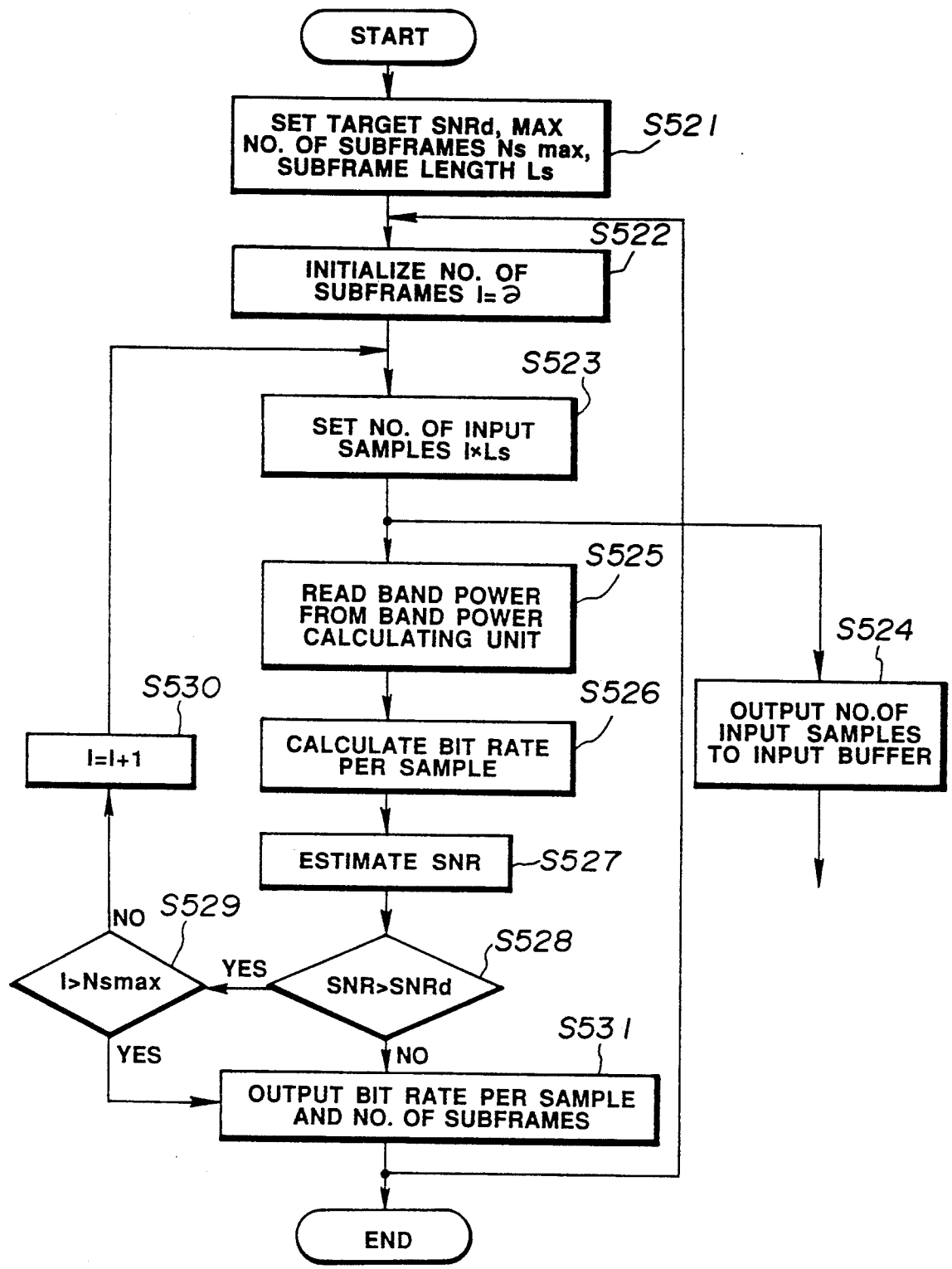
FIG. 6 is a flowchart illustrating the processing operation in a bit rate control unit in the encoder section shown in FIG. 2.

In particular, the bit rate control is conducted in accordance with the flowchart shown in FIG. 6.

First, as initialization, samples of the targeted SNRd, the maximum number of subframes in one cell Nxmax, and the subframe length Ls are set (S521).

Then, a setting is provided such that I = ∂ as the initial value of the number of subframes I (S522).

Then, the number of input samples to be inputted to the QMF bank 102 is set as I×Ls, and processing for instructing the same to the input buffer 101 is effected (S523, S524).

Then, the RMS value σi of each band determined by the band power calculating circuit 105 is read (S525), and a bit rate R (Kbps) necessary for transmitting in one cell the signal sequence of I×Ls samples to be encoded is calculated in accordance with the following formula (S526):

$$R = \left(\frac{B}{I \times Ls}\right) \times 8 \qquad (3)$$

where B is the total number of bits assigned for transmission of the code of the band signal, and B = 41×8 = 328 bits in the format shown in FIG. 4. Then, the SNR of the signal decoded by the decoder section is estimated in accordance with the following formula by using the RMS value σi of each band and the bit rate R determined in accordance with Formula (3) above (S527):

$$SNR = 10 \log 10 \left[ \frac{\sum_{k=1}^{Mb} \sigma_k^2}{Mb \cdot \epsilon^2 \cdot 2^{-2R/8} \left(\prod_{K=1}^{Mb} \sigma_k^2\right)^{1/Mb}} \right] \qquad (4)$$

where Mb is the number of division of a band, and in this embodiment Mb = 8.

The above formula for estimating the SNR is based on the result of theoretical analysis of a square mean value of decoding error in a case where optimum bit distribution is effected, in a sub band encoding method.

Table 1 shown below compares values estimated in accordance with Formula (4) above and values of SNR determined through computer simulation.

TABLE 1

| Frame No. | Estimated SNR | SNR Determined Through Simulation |
| --- | --- | --- |
| 1 | 23.4 | 23.9 |
| 2 | 10.9 | 9.9 |
| 3 | 12.3 | 12.6 |
| 4 | 21.0 | 21.8 |
| 5 | 29.4 | 28.7 |
| 6 | 25.9 | 26.1 |
| 7 | 17.6 | 16.2 |
| 8 | 26.3 | 25.4 |
| 9 | 23.5 | 24.4 |

The table shows that the estimated values correspond well to SNR values in the case where encoding is actually effected.

It should be noted, however, that Table 1 is an example in which the bit rate is set at 16 Kbps.

After the estimation of the SNR, a comparison is made between the SNR and the target SNRd (S528).

Here, if the SNR is greater than the SNRd, a check is made as to whether or not the number of subframes I is not greater than the maximum number of subframes Nsmax (S529). After incrementing the number of subframes (S530), the operation returns to processing in S523 and onward.

This processing is repeated until the SNR becomes not greater than the SNRd, and the bit rate per sample and the number of subframes (I−1) persisting immediately before SNR becomes greater than SNRd in the processing of S528 are outputted (S531).

Meanwhile, if the number of subframes I exceeds Nsmax in the processing of S529, the bit rate per sample and the number of subframes I = Nsmax are outputted. In the bit rate controlling method referred to herein, the number of input samples to be encoded is increased while the SNR is being estimated, so as to change the bit rate. This controlling method offers the following advantages:

I. The quality can always be maintained at a fixed level.

II. The encoded data can be placed accurately in a cell of a fixed length.

III. The encoding efficiency is high since the bit rate is changed in correspondence with changes with time of the nature of input signals.

Next, in the encoder section, the number of quantized bits in each band is calculated on the basis of the bit rate calculated in Formula (3) above, and distribution thereof is effected.

This processing (processing in S506 in FIG. 5) is executed by the bit distribution calculating unit 109 as will be described below.

Figure 7:
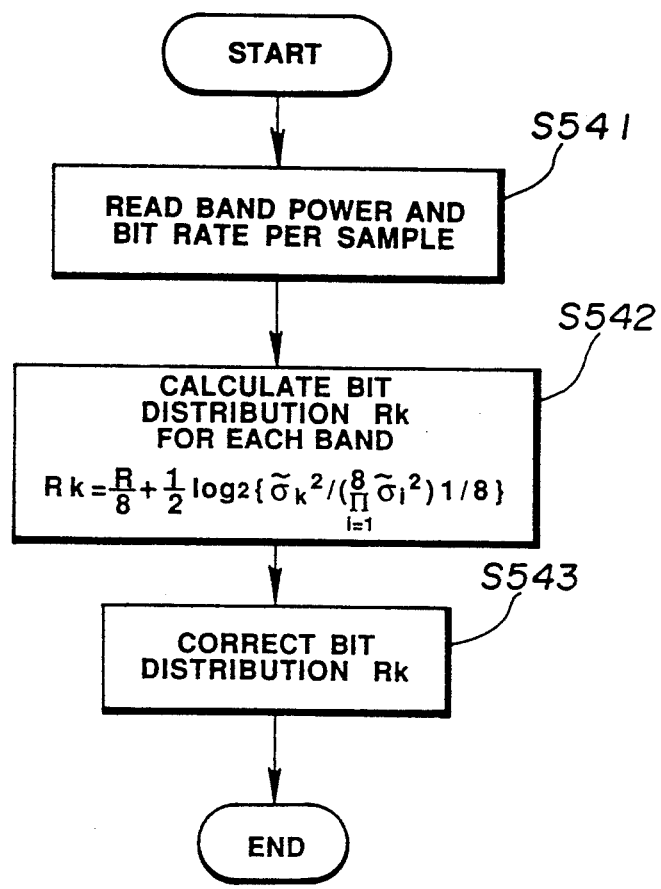
FIG. 7 is a flowchart illustrating the processing operation in a bit distribution calculating unit in the encoder section shown in FIG. 2.

That is, the operation of this bit distribution calculating unit 109 is executed in accordance with a flowchart shown in FIG. 7.

First, in the bit distribution calculating unit 109, after the RMS value $\tilde{\sigma}i$ as the power of each band and the bit rate R per sample are read from the inverse quantizer 107 and the bit rate control unit 108 (S541), the bit distribution amount Rk for each band is calculated in accordance with the following formula (S542):

$$Rk = \frac{R}{8} + \frac{1}{2} \log 2 \left[ \frac{\tilde{\sigma}_k^2}{\left( \prod_{i=1}^{Mb} \tilde{\sigma}_i^2 \right)^{1/Mb}} \right]; \quad (5)$$

$K = 1, 2, \ldots, Mb$
$Mb = 8$

Formula (5) is a formula of optimum bit distribution for minimizing the square mean value of decoding error, and is described in "Digital Coding of Waveforms" by N. S. Jayant and P. Noll, PRENTICE-HALL, NJ (literature 4).

Although the bit distribution amount Rk calculated in Formula (5) above assumes a real value, in a case where a scalar quantizer is used at the time of quantizing the signal of each band, it is necessary to set Rk to an integral value, so that correction of Rk is then effected (S543)

Figure 8:
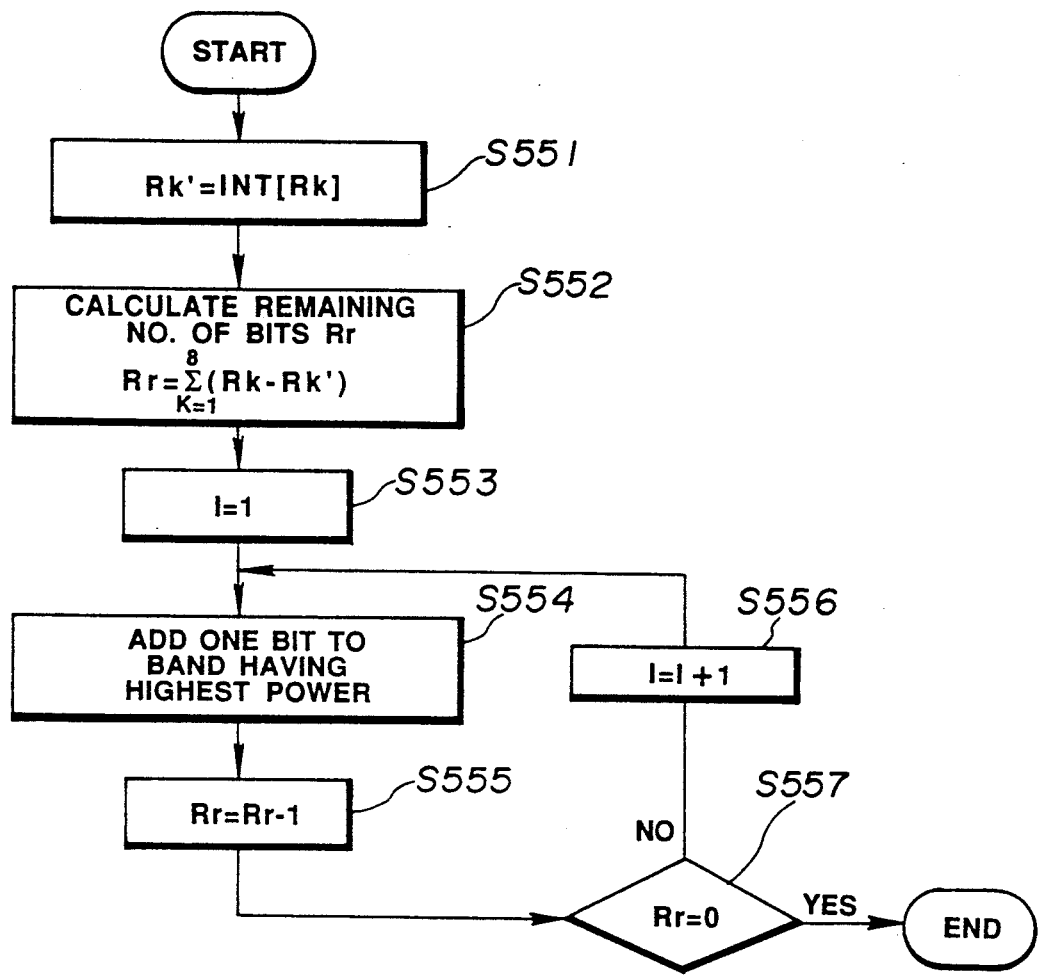
FIG. 8 is a flowchart explaining a method of bit distribution correction which is one of the processes shown in FIG. 7.

Referring now to a flowchart shown in FIG. 8, a description will be given of one embodiment of the method of correcting Rk.

In this correction processing, after the bit distribution amount Rk is first converted to an integer by omitting the figures after the decimal point (S551), the number of residual bits Rr resulting from this process of obtaining an integer is calculated in accordance with the following formula (S552):

$$Rr = \sum_{k=1}^{Mb} (Rk - Rk') \quad (6)$$

Then, the residual bits Rr are redistributed bit by bit to bands in the descending order of power (S553–S557).

The redistribution of bits in the descending order of power in this manner produces the advantage of reducing decoding error.

The above-described processing has been described to show the details of processing in S506 in FIG. 5.

After calculation of the bit distribution, in the encoder section, the signal of each band is quantized on the basis of the bit distribution thus determined (S507).

Then, Huffman tables are respectively prepared in advance in correspondence with the respective numbers of quantized bits, Huffman coding (entropy coding) is effected with respect to each quantized value, and the sum total of the code amount of the entire bands is calculated (S508, S509).

The fact that entropy coding is effected brings about the advantage of reducing the sum total of code amount as compared with a case where it is not effected.

In the bit rate control correcting unit 112, correction of the bit rate is executed in correspondence with the reduced code amount (S510).

Here, a description will be given of the operation of the bit rate control correcting unit 112 with reference to FIG. 5.

First, in the bit rate control correcting unit 112, if the calculated sum total of the code amount of the entire bands is less than the total number of bits B allotted to transmit the band signal, the operation returns to processing immediately preceding S502 in FIG. 5 to increment the number of subframes I. This processing is repeated until the total sum of the code amount reaches B or more, whereupon the bit rate R persisting immediately before the sum total of the code amount becomes greater than B and the number of subframes I are outputted.

Furthermore, in the bit rate control correcting unit 112, in order to compensate for the portion compressed by entropy coding, the bit rate R outputted is incremented, and the operation then returns to processing in S506 and onward in FIG. 5.

Similarly, this processing is repeated until the total sum of the code amount reaches B or more, whereupon the bit rate R persisting immediately before the sum total of the code amount becomes greater than B is outputted.

As described above, the quality of compression ratio can be further improved by virtue of correction processing by the bit rate control correcting unit 112.

Finally, in the encoder section, cellulation is carried out with respect to the corrected number of subframes and the encoded data at the time of the bit rate (S511), and then transmission is effected.

The above is a description of the operation of the encoder section, and a description will now be given of the decoder section.

Figure 9:
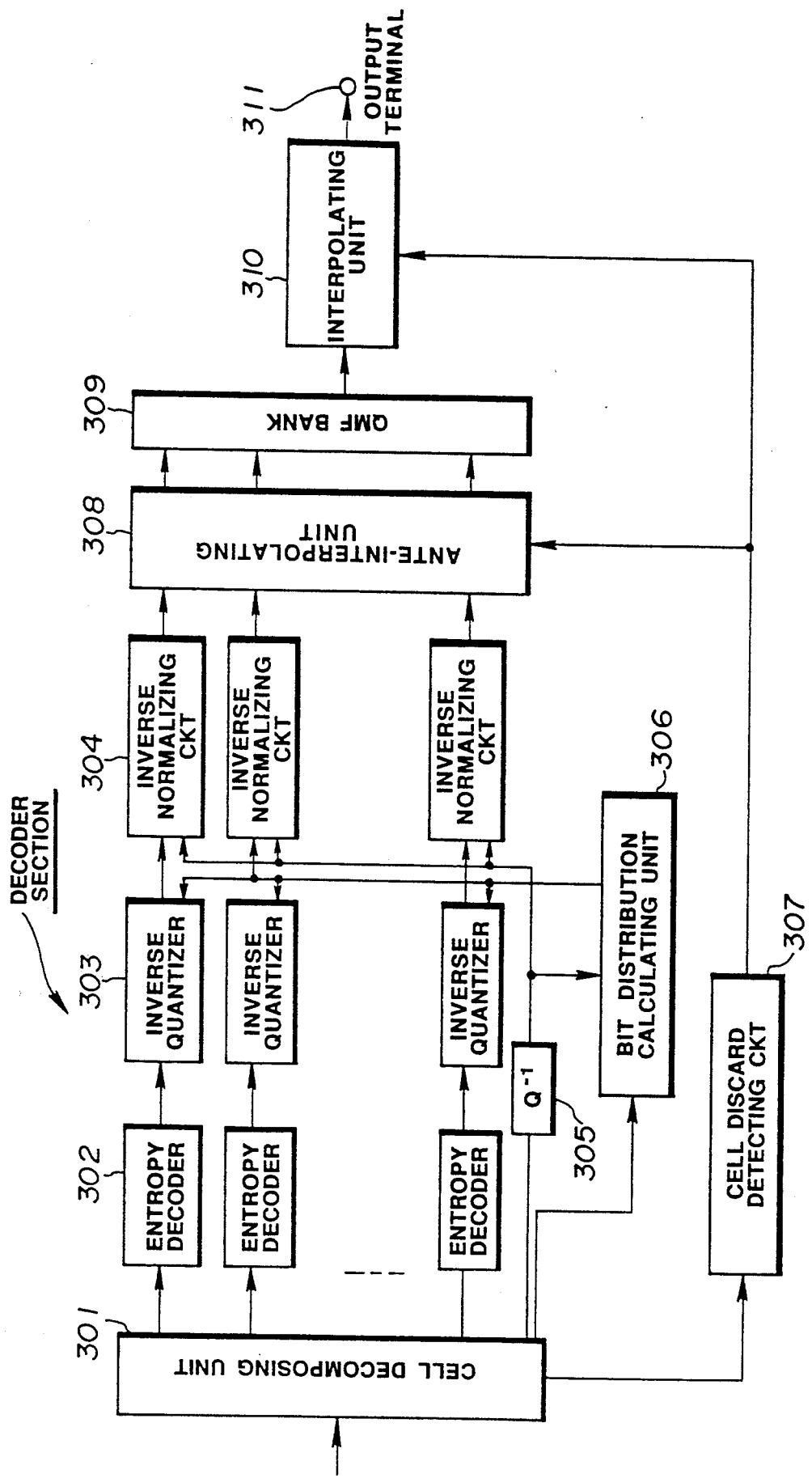
FIG. 9 is a block diagram illustrating an embodiment of a decoding section provided in the receiver in the network communication system shown in FIG. 1.

FIG. 9 is a block diagram of a configuration of the decoder section provided in the receiver 1b in the network communication system shown in FIG. 1 so as to effect decoding processing adapted to the above-described variable rate encoding method in accordance with the present invention.

In FIG. 9, a cell decomposing unit 301 decomposes the cell formed in accordance with the format shown in FIG. 4 into various data on the time stamp, the band power, the sum of the numbers of quantized bits distributed to respective bands, and the band signal.

Reference numeral 302 denotes an entropy decoder, and a decoded value is inputted to an inverse quantizer 303. This inverse quantizer 303 inversely quantizes the signals of the respective bands, and is realized by referring to a look-up table in the same way as the quantizer 104 shown in FIG. 2.

An inverse normalizing circuit 304 effects multiplication of the output of the inverse quantizer 303 by an RMS value $\tilde{\sigma}k$ ($k = 1, 1, \ldots, Mb$) of each band.

A bit distribution calculating unit 306 calculates the amount of bits distributed to each band in a manner similar to that of the bit distribution calculating unit 109 shown in FIG. 2, by using the RMS value $\tilde{\sigma}k$ of each band and the number of subframes Ns in one cell.

First, an average number of bits R per sample is calculated in accordance with Formula (3) described above, and the amount of bit distribution Rk ($k = 1, 2, \ldots, Mb$) to each band is calculated in accordance with Formula (5) above.

A cell-discarding detecting circuit 307 detects the presence of discarding of a cell on the basis of the time stamp Ts and the number of subframes Ns transmitted thereto.

Figure 10:
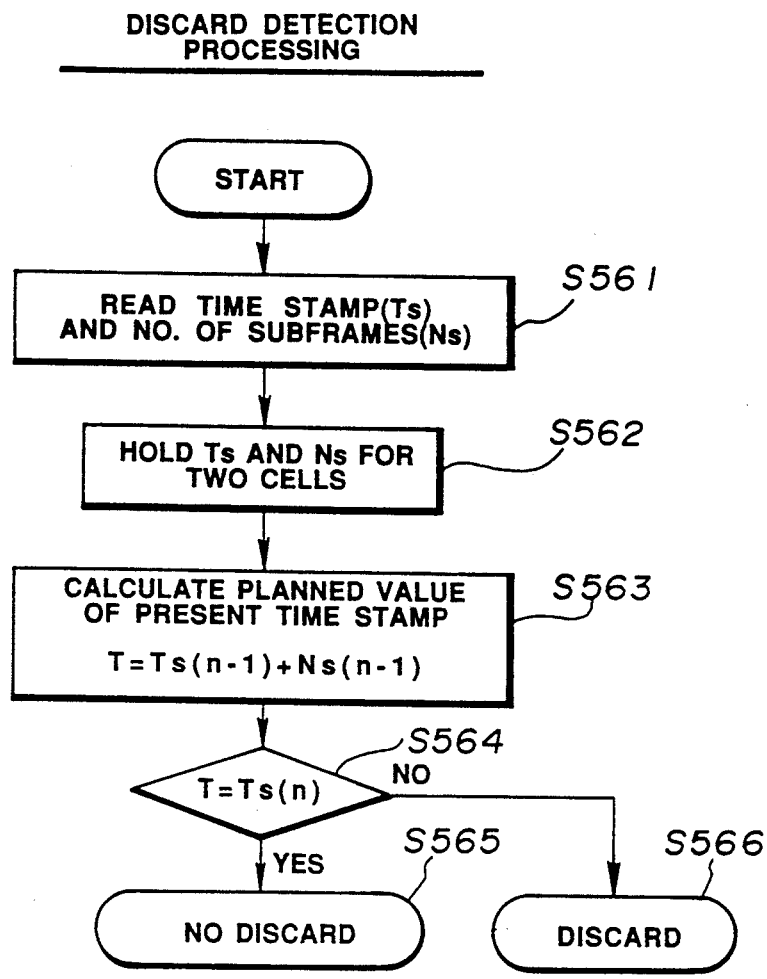
FIG. 10 is a flowchart illustrating the processing operation in a cell-discarding detecting circuit in the decoder section shown in FIG. 9.

FIG. 10 is a flowchart illustrating a method of detecting cell discarding just mentioned.

A detailed description will be given of the detecting method by also referring to FIG. 11.

First, in the cell discarding detecting circuit 307, the time stamp Ts and the number of subframes Ns are read (S561), and a two-cell portion of these items of data is always held (S562).

Then, an estimated value T of the present time stamp is calculated in accordance with the following formula by using a time stamp Ts (n−1) and the number of subframes Ns(n−1) of a cell preceding one time duration to the cell which has arrived presently (time n) (S563):

$$T = Ts(n-1) + Ns(n-1)$$

A comparison is then made between the estimated value T determined at this juncture and the present time stamp Ts(n) (S564).

Here, if they agree with each other, it is determined that there has been no discarding, and if they do not agree, it is determined that there was discarding immediately before the present cell, and processing is executed in correspondence with the respective cases (S565 or S566).

Figure 11:
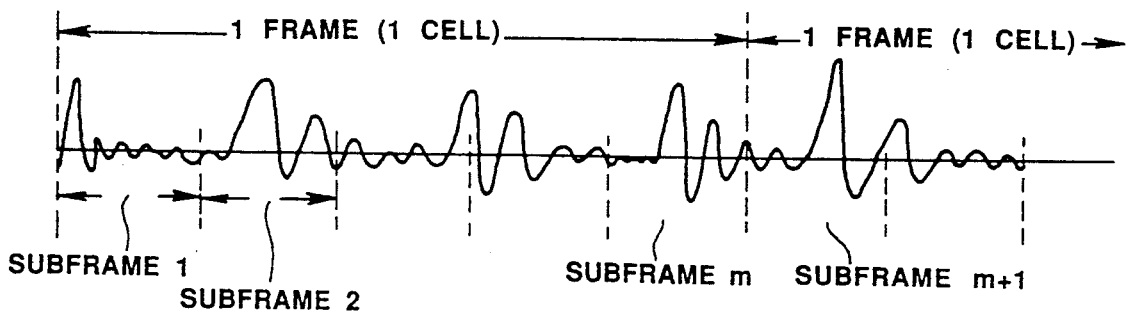
FIG. 11 is a signal waveform diagram explaining a method of detecting cell discarding in the cell-discarding detecting circuit.

For instance, in the case of an example shown in FIG. 11, since $$\left. \begin{array}{l} Ts(n-1) = 1 \\ Ns(n-1) = m \\ T = Ts(n-1) + Ns(n-1) = m + 1 \\ = Ts(n) \end{array} \right\} \quad (7)$$

processing in the case of no discarding is executed.

Again returning to FIG. 9, an anti-interpolating circuit 308 allows the signal of each band to bypass to a QMF bank 309 if there has been no discarding, while the anti-interpolating circuit 308 inputs "0," instead of the band signal, to the QMF bank 309 if there has been discarding.

The QMF bank 309 receives as its input the signals of divided bands, and outputs a full-band signal, and its configuration is one in which the input and output of the circuit shown in FIG. 3 are reversed.

The decoded signal obtained after being allowed to pass through the QMF bank 309 is sent to an interpolating unit 310 where an interpolation is carried out with respect to the dropout of the signal due to the discarding of the cell.

Figure 12:
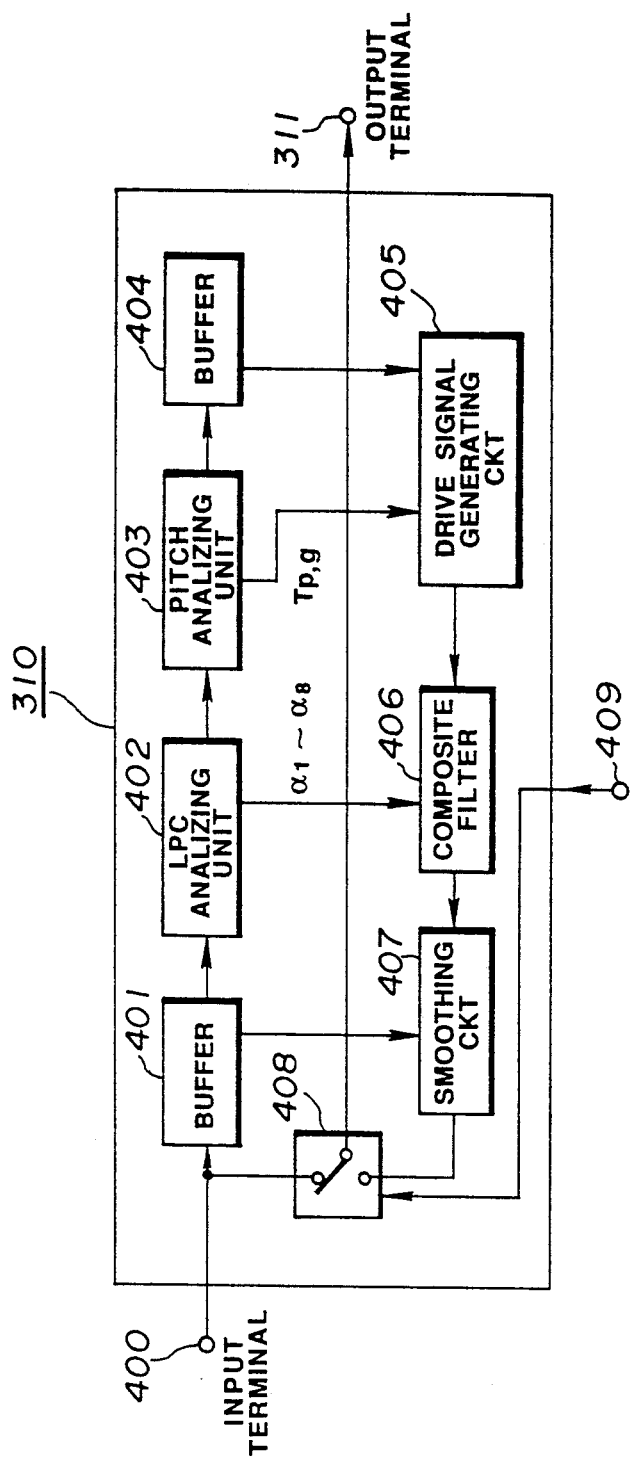
FIG. 12 is a block diagram illustrating an example of an interpolating unit in the decoder section shown in FIG. 9.

FIG. 12 is a block diagram illustrating an embodiment of the interpolating unit 310, and parts (a) to (e) of FIG. 13 illustrate examples of signal waveforms explaining interpolation by the interpolating unit 310.

In FIG. 12, the decoded signal inputted from an input terminal 400 bypasses to an output terminal 311 if there has been no cell discarding, in accordance with a cell-discarding signal supplied from a terminal 409. If there has been cell discarding, the decoded signal is routed for interpolation, as will be described below.

In this interpolation, the decoded signal of a cell immediately preceding a discarded cell is read from a buffer 401, and is inputted to an LPC analyzing unit 402.

In the LPC analyzing unit 402, LPC analysis is conducted in accordance with an autocorrelation method and a covariance so as to determine estimation coefficients $a1, a2, \ldots, ap$ (p is a degree of estimation, and is set to 8 in this case) and an estimated residual signal e(n).

As for the method of LPC analysis, since a detailed description is given in "Digital Signal Processing of Speech" by L. R. Rabiner and R. W. Shater and translated by Suzuki, CORONA PUBLISHING CO., LTD. (literature 5), a description thereof will be omitted.

It should be noted that the transmission function H(z) of the estimation filter can be expressed by $$H(z) = 1 - \sum_{i=1}^{P} a_i Z^{-i} \quad (8)$$

Next, pitch analysis is conducted with respect to the estimated residual signal e(n), and a pitch period Tp, a gain g, and an estimated residual signal ep(n) are determined.

Although the method of pitch analysis is also given in literature 5, it is assumed herein that the pitch period Tp and the gain g are determined as follows.

That is, a sampling point of the trailing end of the frame in the decoded signal of a cell (frame) immediately preceding the cell in which discarding has occurred is set as n=N, and an error function E (TP) is defined as follows:

$$E(Tp) = \sum_{n=N-L}^{N} |x(n) - x(n - Tp)|; \quad (9)$$

$$20 \leq Tp \leq 140$$

where L is a section length for evaluating the error, and a setting is provided herein that L=70.

The pitch period Tp is determined as Tp which minimizes E (Tp) in the above formula.

In addition, the pitch gain g is calculated by the following formula after Tp is determined.

$$g = \frac{\sum_{n=N-Tp}^{N} x(n) \cdot x(n - Tp)}{\sum_{n=N-Tp}^{N} \{x(n - Tp)\}^2} \quad (10)$$

In addition, the estimated residual signals e(n) and ep(n) are calculated by the following formulae, and ep(n) is accumulated in the buffer 404.

$$e(n) = x(n) - \sum_{i=1}^{P} ai \, x(n - i) \quad (11)$$

$$ep(n) = e(n) - g \cdot e(n - Tp) \quad (12)$$

where x(n) is a signal outputted from the buffer 401.

Next, in a drive signal generating circuit 405, a Tp sampling portion [see the part (b) of FIG. 13] from the trailing end of the estimated residual signal ep(n) of the preceding cell is read from the buffer 404. Then, a signal obtained by multiplying that residual signal by the pitch gain g is repeatedly connected, thereby generating a drive signal such as the one shown in the part (c) of FIG. 13.

This drive signal is then inputted to a synthesis filter 406 which is an inverse filter to the estimation filter of Formula (8) above, thereby composing the signal of the discarded cell.

The composed signal [see the part (d) of FIG. 13] is subjected to smoothing processing by a smoothing circuit 407 with respect to the cell immediately preceding the discarded cell [see the part (a) of FIG. 13] or decoded signals of the immediately preceding and following cells.

As a result, the output waveform of the smoothing circuit 407 becomes such as the one shown in the part (e) of FIG. 13.

If it is assumed that the decoded signal of the preceding cell is X(n), the composed signal is x(n), and the smoothed output is y(n), smoothing processing is effected in accordance with the following formula:

$$y(n) = \{1 - W(n)\} \cdot x(n) + W(n) \cdot x(n) \quad (13)$$

where W(n) is a window function of smoothing, and a typical one thereof is shown in FIG. 14.

The above-described interpolation in this embodiment can be said to be an interpolation of the drive signal. This method offers the advantage that even if there are discontinuous points in a waveform with respect to the cells immediately preceding and following the cell in question in the drive signal, the discontinuous points can be smoothed as they pass through the synthesis filters, thereby rendering the discontinuous points hardly perceivable in the voice.

Furthermore, since the continuity with the immediately preceding and following cells is enhanced by means of the smoothing circuit, this method offers the advantage that the deterioration of the decoded signal due to cell discarding can be hardly perceived in the voice.

In the foregoing embodiments, as a result of a simulation conducted by using a computer under the conditions of the number of bands set to 8, the subframe length set to 24 samples, the maximum number of subframes set to 12, and the target SNR set to 22 dB, it was possible to attain the quality of more than 32 Kbps at an average bit rate of 21 Kbps on an ADPCM basis. In addition, it was confirmed that the deterioration of quality at a cell-discarding rate of 5% is not practically perceived.

Thus, in accordance with the present invention, since the encoded bit rate is controlled in units of frames, the quality of the decoded signal can be maintained at a fixed level, and, in particular, an improvement in a compression rate can be expected since the entropy coding is used.

Since the numbers of encoded bits in the respective frequency bands are distributed on the basis of the signal power for respective frequency bands, it is possible to improve the SNR of the decoded signal and obtain high decoding quality.

Moreover, since control is provided such that the sum total of encoded data is accommodated in a cell of a fixed length, a decline in efficiency due to an excess or shortage of decoded data does not occur.

Since the signals of a plurality of frequency bands are encoded independently in units of frames, there occurs no continuation of the deterioration of quality due to cell discarding as experienced in ADPCM and embedded ADPCM in which estimation and quantization are controlled by using past signals. Hence, the deterioration of quality, if any, can be confined to the discarded cell alone. Since influence is small even if any cell is discarded, it is unnecessary to effect preferential control of the cell, so that the system can be simplified.

Furthermore, the interpolation of the present invention offers the advantage that the discarded cell can be reproduced without the deterioration of quality being practically perceived.

What is claimed is:

1. A transmitter for use in a network communication system, comprising:
    band-signal dividing means for dividing a signal sequence into signals of a plurality of frequency subbands;
    coding means for coding the signal of each of the subbands by an entropy coding method; and
    information-unit composing means for composing the coded signal of each of the subbands into an information unit of a fixed length or a variable length,
    wherein in a case where the signal sequence is transmitted via the network communication system, the signal sequence is coded by the entropy coding method in units of frames with respect to each signal of the plurality of frequency subbands, and is transmitted to a network of the network communication system as the information unit of the fixed length or the variable length.

2. A transmitter for use in a network communication system according to claim 1, wherein the network of the network communication system is an ATM exchange network, and the information-unit composing means comprises cell generating means for building up the signal of each of the subbands encoded by the coding means into the information unit called a cell and having the fixed length.

3. A transmitter for use in a network communication system according to claim 1, wherein the network of the network communication system is a packet exchange network, and the information-unit composing means comprises packet generating means for building up the signal of each of the subbands encoded by the coding means into the information unit called a packet and having the variable length.

4. A receiver for use in a network communication system, comprising:
    information-unit decomposing means for decomposing an information unit having a fixed length or a variable length and composed of a signal sequence entropy-coded for a plurality of subbands, into encoded signals of the plurality of subbands;
    decoding means for decoding the decomposed entropy-coded signal of each of the subbands; and
    combining means for combining the decoded signals of the subbands into a signal of a full band,
    wherein in a case where the information unit having the fixed length or the variable length and entropy-coded for each of the subbands is received from the network of the network communication system, the information unit is decoded in units of frames for each of the subbands, and the decoded signal sequence of the full band is obtained by combining the decoded signals.

5. A receiver for use in a network communication system according to claim 4, wherein the network of the network communication system is an ATM exchange network, and the information-unit decomposing means comprises cell generating means for decomposing a cell of the fixed length received as the information unit from the network into the signal of each of the subbands.

6. A receiver for use in a network communication system according to claim 4, wherein the network of the network communication system is a packet exchange network, and the information-unit decomposing means comprises packet generating means for decomposing a packet of the variable length received as the information unit from the network into the signal of each of the subbands.

7. A transmitter for use in a network communication system, comprising:

band-signal dividing means for fetching a signal sequence in units of a predetermined number of samples and dividing into signals of a plurality of frequency subbands;

power calculating means for calculating a power of a signal of each of the plurality of subbands;

number-of-quantized bits calculating means for calculating the number of bits at the time of quantizing the signal of each of the subbands of the predetermined number of samples, on the basis of the power determined by the power calculating means;

bit-rate control means for variably controlling the distribution of the numbers of quantized bits determined by the number-of-quantized bits calculating means;

quantizing means for quantizing the signal of each of the subbands of the predetermined number of samples on the basis of the number of quantized bits distributed through control by the bit-rate control means;

coding means for coding the quantized signal by an entropy coding method; and information-unit composing means for composing a time stamp, the encoded signal of each subband, power of the signal, the number of samples of the input signal of each subband being sampled for determining the number of the quantized bits, and the number of the quantized bits into an information unit of a fixed length or a variable length, wherein in a case where the signal sequence is transmitted via the network communication system, the signal sequence is coded by the entropy coding method in units of frames at different bit rates for the respective signals of the plurality of frequency subbands, and is transmitted to a network of the network communication system as the information unit of the fixed length or the variable length.

8. A transmitter for use in a network communication system according to claim 7, further comprising:

means for estimating the quality of a decoded signal on a receiver side form a bit rate calculated for a specific number of input sample signals.

wherein the bit-rate control means varies the bit rate by increasing or decreasing the number of input samples in such a manner that the quality of the estimated decoded signal becomes fixed.

9. A transmitter for use in a network communication system according to claim 8, further comprising:

code-amount calculating means for calculating a sum total of an amount of data encoded for each of the subbands by the coding means, wherein the bit-rate control means variably controls the bit rate of the signal of each of the subbands in such a manner that the sum total of the amount of data encoded for the respective subbands becomes a fixed value.

10. A transmitter for use in a network communication system according to claim 7, wherein the band signal dividing means comprises a QMF bank.

11. A transmitter for use in a network communication system according to claim 10, wherein the respective numbers of filter elements of first, second, and third stages of the QMF bank assume different values.

12. A transmitter for use in a network communication system according to claim 7, wherein the network of the network communication system is an ATM exchange network, and the information-unit composing means comprises cell generating means for building up the encoded signal of each of the subbands into the information unit called a cell and having the fixed length.

13. A transmitter for use in a network communication system according to claim 7, wherein the network of the network communication system is a packet exchange network, and the information-unit composing means comprises packet generating means for building up the encoded signal of each of the subbands into the information unit called a packet and having the variable length.

14. A receiver for use in a network communication system, comprising:

information-element decomposing means for decomposing an information unit having a fixed length or a variable length and composed of a signal sequence representing a time stamp, an entropy-coded signal of each of a plurality of frequency subbands, a power of the signal, number of samples of an input signal of each of subbands sampled as an object of encoding, and the number of quantized bits calculated on the basis of the power at the time of quantizing the signal of each of the subbands of the number of samples;

decoding means for decoding the entropy-coded signal of each of the subbands;

combining means for combining the decoded signals of the subbands into a signal of a full band;

discarded-information detecting means for detecting an information element discarded on the basis of a result of decomposition by the information-element decomposing means; and reproducing means for reproducing a section of the discarded information element, wherein in a case where the information unit having the fixed length or the variable length and obtained by encoding the signals of the plurality of subbands at different bit rates for units of frames is received from a network of the network communication system, the information unit is decoded in the units of frames for each of the subbands so as to compose a decoded signal of the full band, and a decoded signal sequence is obtained while an interpolation is being conducted in units of the discarded information recognized in the meantime.

15. A receiver for use in a network communication system according to claim 14, wherein the combining means comprises a QMF bank.

16. A receiver for use in a network communication system according to claim 14, wherein the reproducing means comprises:

LPC analyzing means for determining a first estimated residual signal by LPC analysis on the basis of a cell immediately preceding a discarded cell;

pitch analyzing means for determining a pitch period, a gain, and a second estimated residual signal from the first estimated residual signal by pitch analysis;

drive-signal generating means for repeatedly generating a drive signal by multiplying a signal corresponding to the pitch period at a trailing end of the second estimated residual signal by the pitch gain;

synthesis filter means for combining a signal corresponding to a discarded information element on the basis of the drive signal; and incorporating means for incorporating the combined signal into a cell discarded section.

17. A receiver for use in a network communication system according to claim 16, wherein the incorporating means comprises a smoothing circuit.

18. A receiver for use in a network communication system according to claim 14, wherein the network of the network communication system is an ATM exchange network, and the information-element decomposing means comprises cell-decomposing means for decomposing a cell of the fixed length received from the network into the signal of each of the subbands.

19. A receiver for use in a network communication system according to claim 14, wherein the network of the network communication system is a packet exchange network, and the information-element decomposing means comprises packet-decomposing means for decomposing a packet of the variable length received from the network into the signal of each of the subbands.

* * * * *

UNITED STATES PATENT AND TRADEMARK OFFICE
CERTIFICATE OF CORRECTION

PATENT NO. : 5,241,535
DATED : August 31, 1993
INVENTOR(S) : Hidetaka Yoshikawa

It is certified that error appears in the above-indentified patent and that said Letters Patent is hereby corrected as shown below:

Claim 8, column 19, line 55, change "form" to --from--.

Claim 8, column 19, line 56, change "signals." to --signals,--

Signed and Sealed this

Nineteenth Day of July, 1994

Attest:

BRUCE LEHMAN

*Attesting Officer*  *Commissioner of Patents and Trademarks*